Sept. 4, 1951          S. B. ALCORIZA          2,566,545
BRAKE-FLUID OPERATED SWITCH UNIT
Filed March 31, 1950
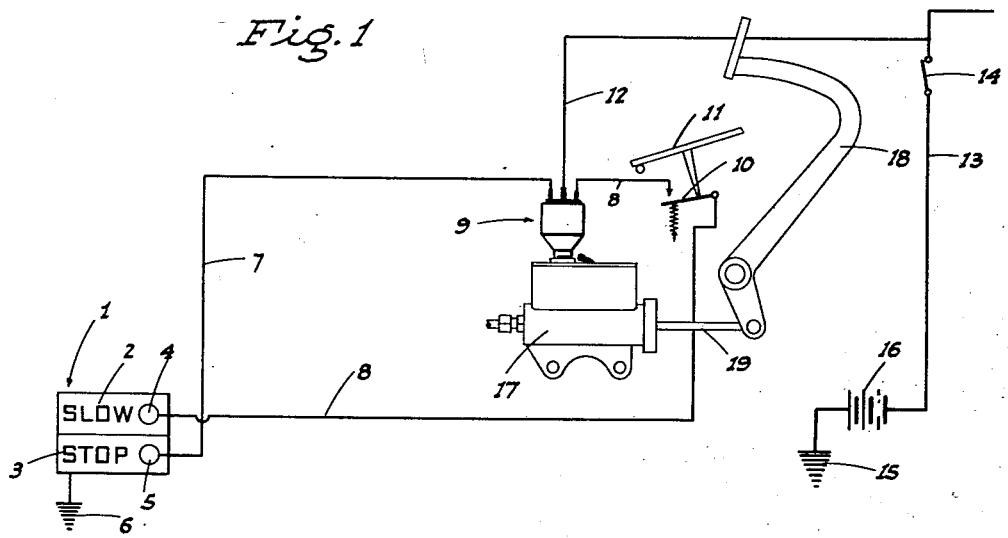
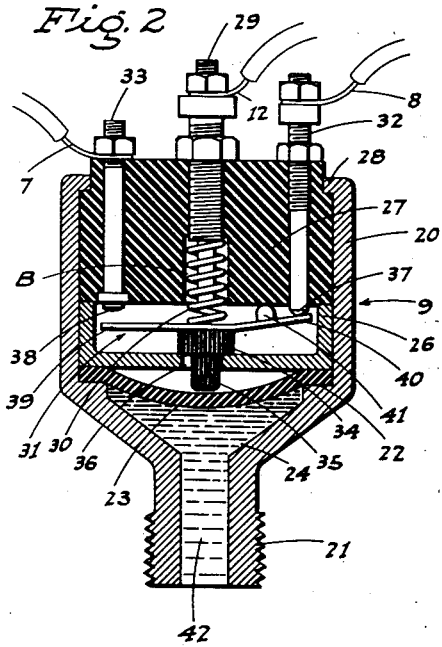
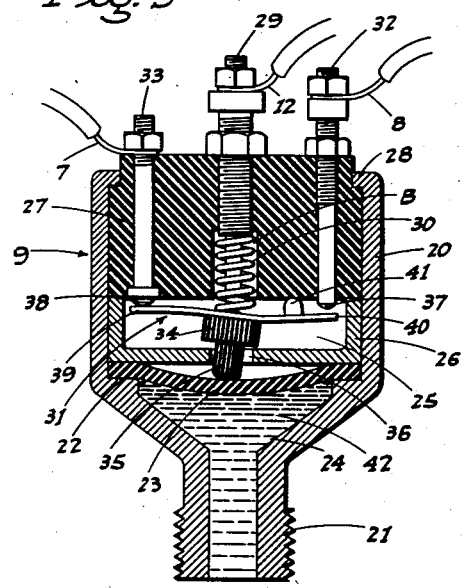
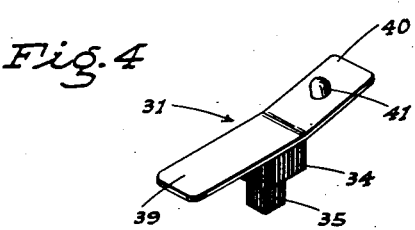
Inventor
Sofronio B. Alcoriza
ATTORNEYS Patented Sept. 4, 1951

2,566,545

UNITED STATES PATENT OFFICE 2,566,545

BRAKE FLUID OPERATED SWITCH UNIT

Sofronio B. Alcoriza, Walnut Grove, Calif.

Application March 31, 1950, Serial No. 153,229

1 Claim. (Cl. 200—83)

This invention is directed to an improved fluid pressure responsive switch unit, especially a switch adapted for use to control signal lights on a motor vehicle.

A major object of the invention is to provide a switch unit which is operative, automatically, to cause energization of a "slow" signal, on the rear of a motor vehicle, when the accelerator pedal is foot released; and to cause deenergization of the "slow" signal and energization of an adjacent "stop" signal when the brakes are applied.

To accomplish this result the invention provides, as another important object, a novel two-way switch unit whose moving parts are responsive to fluid pressure in the hydraulic brake system of the motor vehicle; the switch being normally closed relative to one terminal, and automatically opening relative to the latter and closing with respect to another terminal upon application of the brakes with attendant fluid pressure increase in said brake system.

Another object of the invention is to embody the switch unit in a simple but effective control circuit for the "slow" and "stop" signals.

Still another object of the invention is to provide a switch unit, for the purpose described, which is designed for ease and economy of manufacture; the switch unit being compact, sturdy, weather-proof, and long wearing.

A further object of the invention is to provide a practical and reliable brake-fluid operated switch unit, and one which will be exceedingly effective for the purpose for which it is designed.

These objects are accomplished by means of such structure and relative arrangement of parts as will fully appear by a perusal of the following specification and claim.

In the drawings:

Fig. 1 is a diagram of the signal control circuit with the switch unit therein.

Fig. 2 is an enlarged sectional elevation of the switch unit with the parts in normal positions.

Fig. 3 is a similar view, but shows the switch unit with the parts in the positions occupied thereby in response to increased fluid pressure in the brake system when the brakes are applied.

Fig. 4 is an enlarged view of the contact blade.

Referring now more particularly to the characters of reference on the drawings, the switch unit, which is the subject of the present invention, is adapted for use in a vehicle signal light control circuit, a shown in Fig. 1, for a signal unit, indicated generally at 1, mounted on the rear of the vehicle.

The signal unit 1 comprises a "slow" signal 2 and a "stop" signal 3, which include electric globes 4 and 5 respectively, one terminal of each globe being grounded, as shown diagrammatically at 6.

Energizing leads 7 and 8 extend from the other terminal of the globes 4 and 5 respectively; the "slow" signal 2 thus being controlled by the lead 7, and the "stop" signal 3 controlled by the lead 8.

The leads 7 and 8 extend to connection with the switch unit, indicated generally at 9, which is the subject of this invention; the lead 8 having a spring-closed switch 10 interposed therein, with said switch 10 connected to the accelerator pedal 11 in a manner so that the switch is opened when said pedal is depressed, but closed when the pedal is released.

A current supply lead 12 extends from the switch unit 9 to the battery circuit 13 of the motor vehicle, being connected into a portion of said circuit which is open or deenergized when the ignition switch 14 is off. As conventional the battery circuit 13 is grounded, as at 15, and includes a battery 16.

When the ignition switch 14 is closed, for running of the motor vehicle, the current supply lead 12 is automatically energized.

The switch unit 9 is mounted on the master cylinder 17 of the hydraulic brake system of the motor vehicle; the mounting being such that said switch unit is subjected, internally, to the fluid pressure in the master cylinder 17.

The numeral 18 indicates the brake pedal lever connected to the piston rod 19 of the master cylinder 17.

The switch unit, indicated generally at 9, is constructed and functions in the following manner:

The switch unit 9 comprises a hollow cylindrical body 20 reduced in diameter at one end and formed with a threaded connection 21 whereby said body may be secured on the master cylinder 17 in communication therewith.

Intermediate its ends the cylindrical body 20 is provided with a shoulder 22 which faces away from the connection 21, and a fluid pressure responsive diaphragm 23, of flexible material, is disposed in the body 20, seating on the shoulder 22. The diaphragm 23 thus divides or separates the cylindrical body 20 into a fluid chamber 24 and a switch chamber 25.

The flexible diaphragm 23 is circular and in the central portion thereof normally bows or cups towards the connection 21; such diaphragm 23 being peripherally engaged in place by a spacer cup 26 which closely engages in the body 20 in a position opening away from said diaphragm.

In turn, the spacer cup 26 is held in place by a dielectric plug 27 in the body; said plug being held against escape by flanging-in the adjacent end of the body, as at 28.

A central terminal post 29 extends axially in the dielectric plug 27, and at its inner end portion is surrounded by a compression spring 30 seated in a bore B; such compression spring extending into the switch chamber 25 and engaging, in contact relationship, with a strip-like, spring metal contact blade 31 intermediate the ends of the latter.

The current supply lead 12 connects to the central terminal post 29, and by virtue of the compression spring 30 said lead and post are in electrical contact at all times with the contact blade 31.

Other terminal posts, indicated at 32 and 33, extend through the dielectric plug 27 at diametrally opposed points with respect to the central terminal post 29; i. e. on opposite sides of the latter and in diametral alinement therewith.

The contact blade 31 is formed, on the side opposite the spring 30 and substantially centrally of the ends of said blade, with a supporting and control button 34 which rests on the bottom of the spaced cup 26; there being a reduced-sized stem 35, of rectangular cross section, which projects through an elongated rectangular slot 36 in said bottom of the spacer cup 26. The slot 36 is elongated lengthwise of the blade 31 whereby the button 34 may rock on the bottom of the spacer cup 26 in said direction.

The inner ends of the terminal posts 32 and 33 provide contacts 37 and 38, and when the diaphragm 23 is in normal position; i. e. not under fluid pressure, the control button 34 lies flush on the bottom of the spacer cup 26 with one end portion 39 of the blade 31 clear of the contact 38. However, the other end portion 40 of the blade 31 is inclined so that it normally lies in engagement with the contact 37 (see Fig. 2).

The blade portion 40 is formed with a nub 41 which projects into engagement with the adjacent end of the dielectric plug 27, for the purpose hereinafter described.

Brake fluid 42 from the master cylinder 17 flows into the chamber 24, but under normal conditions does not flex the diaphragm 23 toward the bottom of the spacer cup 26.

When the described switch is in use in connection with the signal unit 1, by means of the described circuit, it controls said signal unit as follows:

The globes 4 and 5 of the "slow" signal 2 and "stop" signal 3 are normally deenergized, for the reason that the switch 10 is open when the accelerator pedal 11 is depressed and the contact blade 31 is normally clear of the contact 38.

Upon release of the accelerator pedal 11, preparatory to a breaking action, the lead 7 is energized through the normally engaged contact 37 and blade portion 40, resulting in the "slow" signal 2 immediately energizing.

Thereafter, when the driver of the motor vehicle depresses the brake pedal lever 18, the lead 7 is deenergized and the lead 8 is energized, whereby the "slow" signal 2 goes off and the "stop" signal 3 is actuated. This results by reason of the following action within the switch unit 9. Upon depression of the brake pedal lever 18 the fluid pressure in the master cylinder 17 and chamber 24 is greatly increased, flexing the diaphragm 23 toward the bottom of the spacer cup 26. When this occurs the stem 35 is thrust inwardly against the compression of spring 30, urging the contact blade 31 in a similar direction. With such movement of the contact blade 31 the blade portion 40 is rocked away from the contact 37 by reason or the nub 41 acting as a fulcrum, and at the same time the blade portion 39 engages the contact 38 (see Fig. 3) to complete a circuit between the lead 8 and the "stop" signal 3.

The switch unit 9 thus provides an extremely practical and effective device for the automatic control of a signal unit which includes a "slow" and a "stop" signal; said signals being actuated in response to release of the acceleration pedal and depression of the brake pedal lever 18, respectively.

Upon release of the brake pedal lever 18, the parts all return to their starting positions, and the "slow" signal 2 will not remain energized after the ignition switch 14 is turned off.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claim.

Having thus described the invention, the following is claimed as new and useful, and upon which Letters Patent is desired:

A fluid pressure switch comprising a hollow body, a dielectric plug closing the outer end of the body, a cross member in the body below and spaced from the plug to leave a switch chamber therebetween, a diaphragm in the body below said member, the body below the diaphragm being arranged for connection with a source of fluid pressure, a pair of spaced terminal posts mounted in and projecting through the plug at right angles to the cross member and terminating in contact points exposed below the plug, a contact blade in the switch chamber disposed so that adjacent its ends it may alternately engage the contact points, a third terminal post in the plug parallel to and in line with and between the first named posts, a compression spring extending between and in contact with said third post and the blade and tending to force the latter toward the cross member, a button depending from the blade and normally resting on said cross member, the contact blade being formed so that at one end it then engages a predetermined one of said contact points, a stem on the button depending through an opening in the cross member for lifting engagement by the diaphragm upon movement of the latter by fluid pressure, and an upstanding nub on the blade to engage the underside of the plug and disposed between said one contact point and the spring and forming a fulcrum point for the tilting of the blade lengthwise upon the lifting of the same to cause said one end of the blade to break from said one contact point and the other end of the blade to engage the other contact point; the opening in the cross member being elongated lengthwise of the blade to allow of tilting of the stem with the blade but fitting the stem transversely whereby to prevent rotation of the stem and blade and maintain the latter alined with the contact points.

SOFRONIO B. ALCORIZA.

REFERENCES CITED

The following references are of record in the file of this patent:

UNITED STATES PATENTS

| Number | Name | Date |
|---|---|---|
| 2,428,096 | Reavis | Sept. 30, 1947 |
| 2,466,111 | Katcher et al. | Apr. 5, 1949 |